(12) United States Patent
Iwamoto et al.

(10) Patent No.: US 12,482,933 B2
(45) Date of Patent: Nov. 25, 2025

(54) CONTROL APPARATUS, WIRELESS COMMUNICATION SYSTEM, AND PROGRAM

(71) Applicant: NTT, Inc., Tokyo (JP)

(72) Inventors: Masayoshi Iwamoto, Tokyo (JP); Akito Suzuki, Tokyo (JP); Masahiro Kobayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/713,853

(22) PCT Filed: Jan. 7, 2022

(86) PCT No.: PCT/JP2022/000403
§ 371 (c)(1),
(2) Date: May 28, 2024

(87) PCT Pub. No.: WO2023/132067
PCT Pub. Date: Jul. 13, 2023

(65) Prior Publication Data
US 2025/0030159 A1    Jan. 23, 2025

(51) Int. Cl.
*H04W 76/18* (2018.01)
*H01Q 3/34* (2006.01)
*H04W 16/28* (2009.01)
*H04W 24/04* (2009.01)

(52) U.S. Cl.
CPC .............. *H01Q 3/34* (2013.01); *H04W 16/28* (2013.01); *H04W 24/04* (2013.01); *H04W 76/18* (2018.02)

(58) Field of Classification Search
CPC ......... H01Q 3/34; H04W 76/18; H04W 16/28; H04W 24/04
See application file for complete search history.

(56) References Cited

U.S. PATENT DOCUMENTS

2014/0286215 A1    9/2014    Koc et al.
2016/0162783 A1    6/2016    Tan et al.

FOREIGN PATENT DOCUMENTS

JP    2015-530851    10/2015
WO    WO-2021255799 A1  * 12/2021    ............ H04W 24/04

OTHER PUBLICATIONS

Masayoshi Iwamoto, Akito Suzuki, Shigeaki Harada, "Shogai area no soki fukkyu no tameno antenna tilt angle seigyo shuho (in Japanese) (Antenna tilt angle control method for early recovery of failure area),", NTT Network Technology Laboratories, NTT Corporation, The IEICE Society Conference, B-7-6, Sep. 2020.

(Continued)

*Primary Examiner* — Henry Luong
(74) *Attorney, Agent, or Firm* — IPUSA, PLLC

(57) ABSTRACT

A control apparatus that determines a relief carrier that relieves communication in a failure area occurring when an antenna of a wireless base station fails and a tilt angle of the relief carrier includes: a failure area aggregation unit that aggregates a plurality of adjacent failure areas to collectively generate a single aggregated failure area; a relief carrier selection unit that selects a plurality of relief carriers for the aggregated failure area; and a tilt angle determination unit that simultaneously optimizes a plurality of tilt angles in the plurality of relief carriers.

6 Claims, 6 Drawing Sheets

(56) References Cited

OTHER PUBLICATIONS

J. Kennedy and R. Eberhart, "Particle swarm optimization," Proceedings of ICNN'95—International Conference on Neural Networks, 1995, pp. 1942-1948 vol. 4, doi: 10.1109/ICNN.1995.488968.

Asghar Muhammad Zeeshan et al.: "Artificial Intelligence Enabled Self-healing for Mobile Network Automation", 2021 IEEE Globecom Workshops (GC Wkshps), IEEE, Dec. 7, 2021 (Dec. 7, 2021), pp. 1-6, XP034046641, DOI: 10.1109/GCWKSHPS52748.2021.9681937 [retrieved on Jan. 13, 2022].

* cited by examiner

CONTROL APPARATUS, WIRELESS COMMUNICATION SYSTEM, AND PROGRAM

TECHNICAL FIELD

The present invention relates to a technique of relieving an area where communication is disabled due to a failure of a wireless base station in a mobile communication network.

BACKGROUND ART

When a wireless base station fails due to a natural disaster or the like, a communication failure occurs in an area covered by the base station. High availability is required for wireless communication, and thus it is necessary to recover the failure in a short time, such as approximately several minutes.

Meanwhile, a technique of changing an angle of depression (tilt angle) of a beam (carrier) in a specific frequency band in an antenna of a base station around an area where a failure has occurred (failure area) to cover (relieve) the failure area, thereby recovering the failure area from the failure (e.g. Non Patent Literature 1) has been studied.

CITATION LIST

Non Patent Literature

Non Patent Literature 1: Masayoshi Iwamoto, Akito Suzuki, Shigeaki Harada, "Shogai area no soki fukkyu no tameno antenna tilt angle seigyo shuho (in Japanese) (Antenna tilt angle control method for early recovery of failure area)," The IEICE Society Conference, B-7-6, September 2020
Non Patent Literature 2: J. Kennedy and R. Eberhart, "Particle swarm optimization," Proceedings of ICNN'95-International Conference on Neural Networks, 1995, pp. 1942-1948 vol. 4, doi: 10.1109/ICNN.1995.488968.

SUMMARY OF INVENTION

Technical Problem

However, in a related art for relieving a failure area, in a case where a failure area caused by a failure of a wireless base station cannot be covered or, even if the failure area can be sufficiently covered, in a case where the failure area cannot be quickly relieved, communication quality may be reduced. That is, the related art may not appropriately relieve the failure area caused by the failure of the wireless base station, which is problematic.

The present invention has been made in view of the above points, and an object thereof is to provide a technique capable of appropriately relieving a failure area caused by a failure of a wireless base station.

Solution to Problem

According to the disclosed technique, there is provided a control device (control apparatus) that determines a relief carrier that relieves communication in a failure area occurring when an antenna of a wireless base station fails and a tilt angle of the relief carrier, the control device including:

a failure area aggregation unit that aggregates a plurality of adjacent failure areas to collectively generate a single aggregated failure area;

a relief carrier selection unit that selects a plurality of relief carriers for the aggregated failure area; and a tilt angle determination unit that simultaneously optimizes a plurality of tilt angles in the plurality of relief carriers.

Advantageous Effects of Invention

According to the disclosed technique, there is provided a technique capable of appropriately relieving a failure area caused by a failure of a wireless base station.

DESCRIPTION OF EMBODIMENTS

Figure 1:
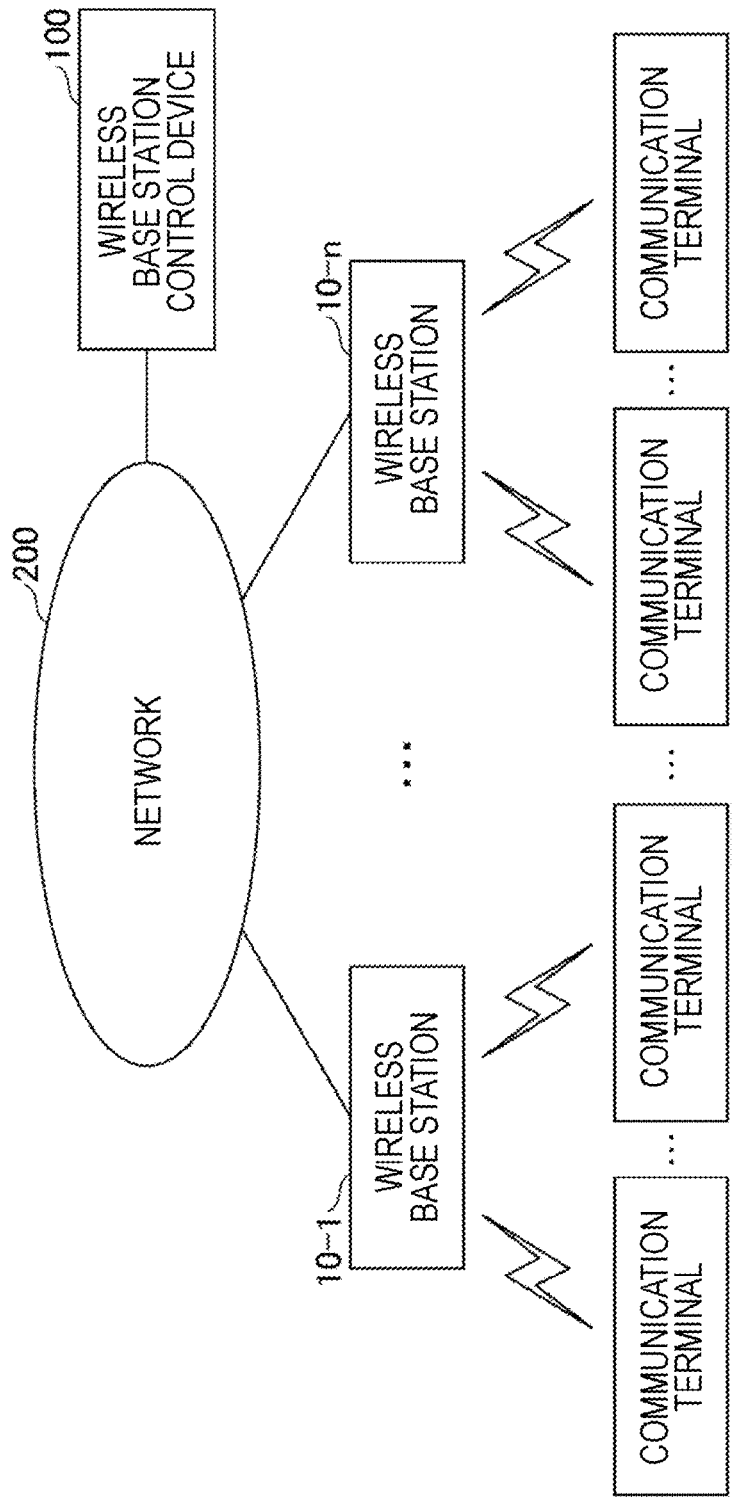
FIG. 1 is a configuration diagram of a system according to an embodiment of the present invention.

Hereinafter, an embodiment of the present invention (present embodiment) will be described with reference to the drawings. The embodiment described below is merely an example, and embodiments to which the present invention is applied are not limited to the following embodiment.

Definitions of Terms

First, definitions of "antenna and carrier" and the definition of "regional mesh" used in the present specification will be described.

(1) Antenna and Carrier

A base station includes a plurality of antennas, and each antenna performs communication coverage in a specific azimuth. The antenna has a plurality of carriers, and each carrier of a certain antenna performs communication coverage in an area in a specific frequency band in the same azimuth. At this time, a tilt angle is set for each carrier, and, when the angle is different, a coverage area is also different.

Only some antennas in a base station fail in some cases, and thus a failure in units of antennas will be considered in the present embodiment, instead of a failure in units of base stations.

(2) Regional Mesh

The regional mesh is "a mesh of regions having approximately the same size into which an area is divided based on latitude and longitude" defined by the Administrative Management Agency (currently known as the Ministry of Internal Affairs and Communications). In the present embodiment, the area is considered in units of mesh.

In the regional mesh, a plurality of regional meshes exists based on granularity of the mesh, that is, a size of an area per mesh. As an example, there are a ½ regional mesh (one side has a length of approximately 500 m) and a ⅛ regional mesh (one side has a length of approximately 125 m).

As the regional mesh is coarser, an amount of calculation required for calculating a coverage area is smaller, which makes it possible to reduce a time required for estimating the coverage area. The granularity of the regional mesh can be determined in advance by, for example, an operator of a wireless base station control device 100 (control apparatus) in the present embodiment.

Problems

Here, the related art and problems thereof will be described in detail. In the following description, content disclosed in Non Patent Literature 1 is publicly known, but content of description of problems thereof is not publicly known.

(1) Related Art and Problem 1

As an existing method, Non Patent Literature 1 discloses a method of covering a failure area caused by a failure of a base station or the like. In the method, one carrier for performing relief (relief carrier) is selected from base stations around the failure area, and a tilt angle of the carrier is changed to cover the failure area.

This is repeated until the failure area is sufficiently covered or until all carriers of neighbor base stations are used. In a case where a plurality of base stations simultaneously fails, failure areas associated with the respective failures are relieved in order.

At this time, a relief carrier needs to be selected from carriers other than carriers used for relief so far. Therefore, in the technique disclosed in Non Patent Literature 1, in a case where "a plurality of base stations simultaneously fails in an area where there is a small number of base stations (peripheral stations) in a periphery such as a local area", there is a high possibility that relief carriers for a failure area to be relieved later are insufficient, and the failure area cannot be covered.

(2) Related Art and Problem 2

As described above, the technique disclosed in Non Patent Literature 1 relieves a plurality of failure areas in order. Further, relief carriers are selected one by one for one failure area, and a tilt angle thereof is calculated.

Therefore, a time required for calculating all control increases according to the number of failure base stations, and a plurality of failure areas may not be quickly relieved.

(3) Related Art and Problem 3

As described above, the technique disclosed in Non Patent Literature 1 selects relief carriers one by one for each failure area and calculates the tilt angle. At this time, only covering the failure area is intended, and overlap with a coverage area of a relief carrier that has already been selected is not considered.

Therefore, even if the failure area is sufficiently covered, radio wave interference may be large, which may reduce communication quality.

Features (Points) of Technique According to Embodiment

In a technique according to the present embodiment, in order to solve the above problems, a wireless base station control device described later controls a tilt angle of a peripheral base station for the purpose of covering a failure area caused by a failure of a base station or the like. The technique according to the present embodiment can solve the above problems particularly by including the following features (points). The following points are points in the technique of the embodiment, and thus it is not essential to include all the points as an invention.

<Point 1>

In a case where a plurality of base stations fails, and failure areas associated with the base stations are adjacent to each other, the failure areas are collectively regarded as a single failure area, and a relief carrier and a tilt angle are calculated for the failure area.

<Point 2>

Relief carriers are prepared in advance for a failure area, and tilt angles thereof are simultaneously optimized, and thus a combination of tilt angles that can obtain a high coverage rate is adopted.

<Point 3>

An objective function in the simultaneous optimization of the tilt angles is set to the "coverage rate of the failure area", and, in addition, a "size of a coverage area of each relief carrier" is added as a penalty term.

Effects of Technique According to Embodiment

The technique according to the present embodiment having the above points has the following effects.

Effect 1

With the point 1, it is possible to alleviate the "problem that possible relief carriers for a failure area become insufficient" described in the problem 1. Therefore, in a case where a plurality of base stations fails in an area where there is a small number of peripheral stations, the coverage rate can be improved, as compared with the existing methods.

Effect 2

With the point 1, a control calculation time does not increase according to the number of failure base stations. This makes it possible to solve the problem 2 and to promptly relieve the base stations even in a case where the number of failure base stations is large.

Effect 3

With the point 2, the tilt angles of the plurality of relief carriers are simultaneously optimized. This makes it possible to improve coverage accuracy, as compared with the conventional method of sequentially changing a tilt angle for each relief carrier.

Effect 4

With the point 3, it is possible to prevent each relief carrier from unnecessarily expanding the coverage area, and thus overlap of the coverage areas between the relief carriers is reduced. Therefore, the radio wave interference between the relief carriers described in the problem 3 is suppressed, as compared with the conventional method. Therefore, improvement in communication quality can be expected.

(Overall Configuration of System)

FIG. 1 illustrates an overall configuration example of a wireless communication system according to an embodiment of the present invention. As illustrated in FIG. 1, the system according to the present embodiment has a configuration in which a plurality of wireless base stations 10 and a wireless base station control device 100 are connected to a network 200. The network 200 is, for example, a network including a mobile core network. Communication terminals exist under the control of each wireless base station, and each communication terminal wirelessly communicates with the wireless base station.

Hereinafter, a configuration and operation of the wireless base station control device 100 according to the present embodiment will be described in detail.

(Configuration Example of Wireless Base Station Control Device 100)

Figure 2:
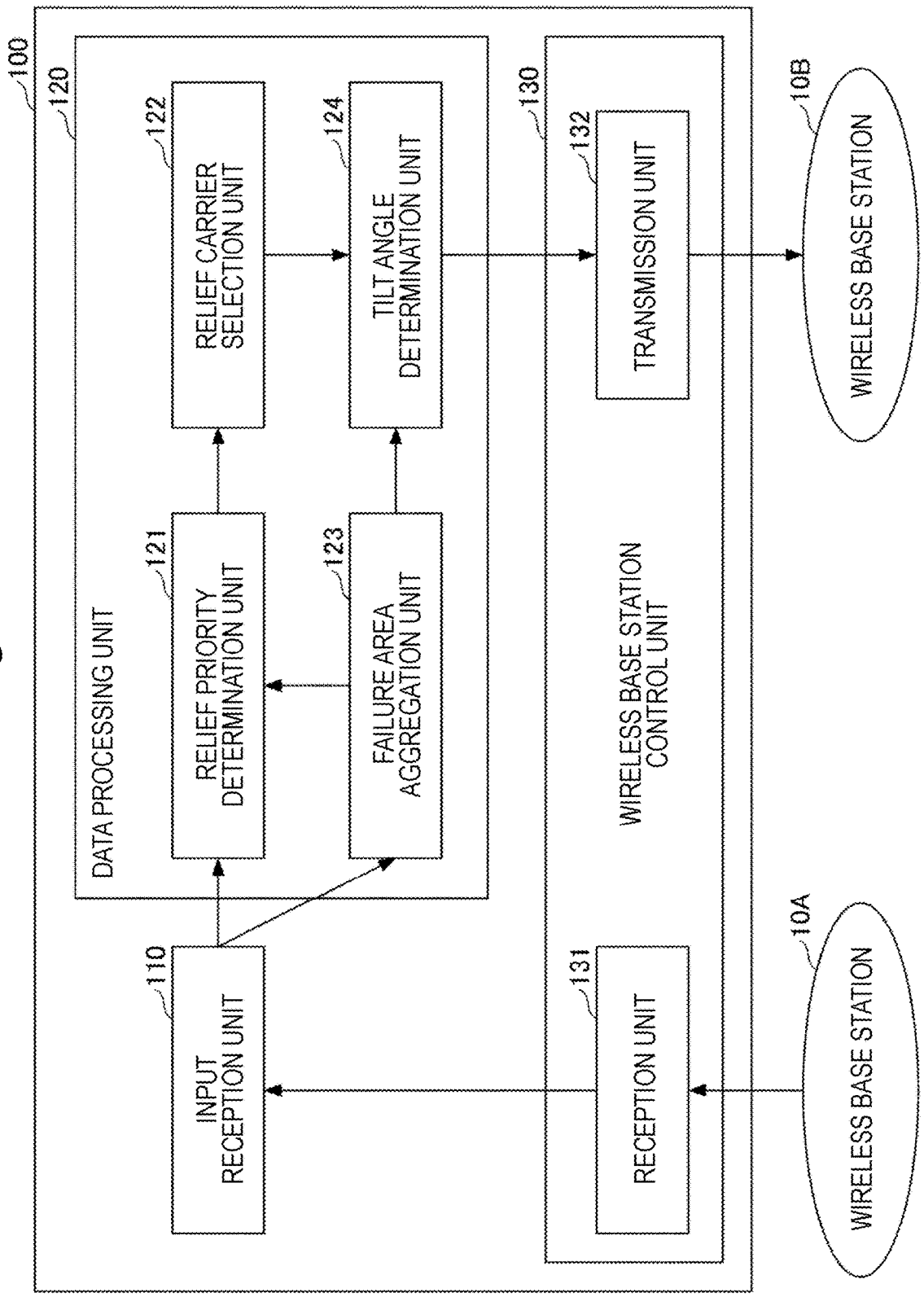
FIG. 2 is a configuration diagram of a wireless base station control device.

FIG. 2 illustrates a configuration diagram of the wireless base station control device 100 according to the embodiment of the present invention. As illustrated in FIG. 2, the wireless base station control device 100 includes an input reception unit 110, a data processing unit 120, and a wireless base station control unit 130.

As illustrated in FIG. 2, the data processing unit 120 includes a relief priority determination unit 121, a relief carrier selection unit 122, a failure area aggregation unit 123, and a tilt angle determination unit 124. The wireless base station control unit 130 includes a reception unit 131 and a transmission unit 132.

The wireless base station control device 100 may be one physical device or a system physically including a plurality of devices. For example, the "input reception unit 110+the data processing unit 120" may be one device, and the wireless base station control unit 130 may be one device. The "input reception unit 110+the data processing unit 120" or the "data processing unit 120" may be referred to as a control device. A functional overview of each unit is as follows.

<Wireless Base Station Control Unit 130>

The reception unit 131 and the transmission unit 132 of the wireless base station control unit 130 each can communicate with a wireless base station. The reception unit 131 receives information from the wireless base station, and the transmission unit 132 transmits information to the wireless base station.

<Input Reception Unit 110>

The input reception unit 110 receives "information regarding each wireless base station", "information regarding an antenna which is out of order (failure antenna) in a failure station", and "important area information" from the wireless base station control unit 130.

The "information regarding each wireless base station" includes, for example, the following information.

Positions (latitude, longitude), heights, and azimuths of all carriers installed in the wireless base station
Vertical and horizontal beam widths of beam of each carrier
Tilt angle set to each carrier
Information regarding adjacent stations In the present embodiment, a wireless base station, which is located within a distance of n (km) from a certain wireless base station (target wireless base station (e.g. failure station)) and is not a failure station, is defined as an adjacent station of the target wireless base station.

The "information regarding an antenna which is out of order (failure antenna) in a failure station" includes, for example, the following information. The following "area" is defined as a set of regional meshes. The following "area covered by a failure antenna" is defined as a failure area.

Presence/absence of an important facility in an area covered by a failure antenna
The area covered by the failure antenna
The number of active users who have communicated with the failure antenna
A total traffic volume that has been processed by the failure antenna The "important area information" is as follows.

A set of regional meshes including important facilities and regional meshes designated in advance by the operator is defined as an important area. By, for example, embedding in advance flag information indicating the important area in the meshes, the information is managed as the important area information.

<Failure Area Aggregation Unit 123>

Upon receipt of information from the input reception unit 110, the failure area aggregation unit 123 generates one failure area in which adjacent failure areas are collectively aggregated. The one failure area obtained by aggregating the plurality of failure areas may be referred to as an aggregated failure area.

<Relief Priority Determination Unit 121>

The relief priority determination unit 121 receives information from the input reception unit 110 and the failure area aggregation unit 123 and determines a relief priority of the failure area. The relief priority is defined based on a property of the failure area. Relieving failure areas one by one from a failure area having the highest relief priority will be considered.

<Relief Carrier Selection Unit 122>

The relief carrier selection unit 122 selects, for the failure area to be relieved, a relief carrier from base stations around the failure area.

<Tilt Angle Determination Unit 124>

The tilt angle determination unit 124 determines a tilt angle of the relief carrier selected by the relief carrier selection unit 122 such that a high coverage rate is obtained for the failure area, and overlap of coverage areas between relief carriers is reduced. A specific operation will be described below.

The tilt angle determination unit 124 transmits the determined tilt angle to the wireless base station control unit 130 and changes the tilt angle of the relief carrier in the wireless base station.

(Operation of Wireless Base Station Control Device 100)

Figure 3:
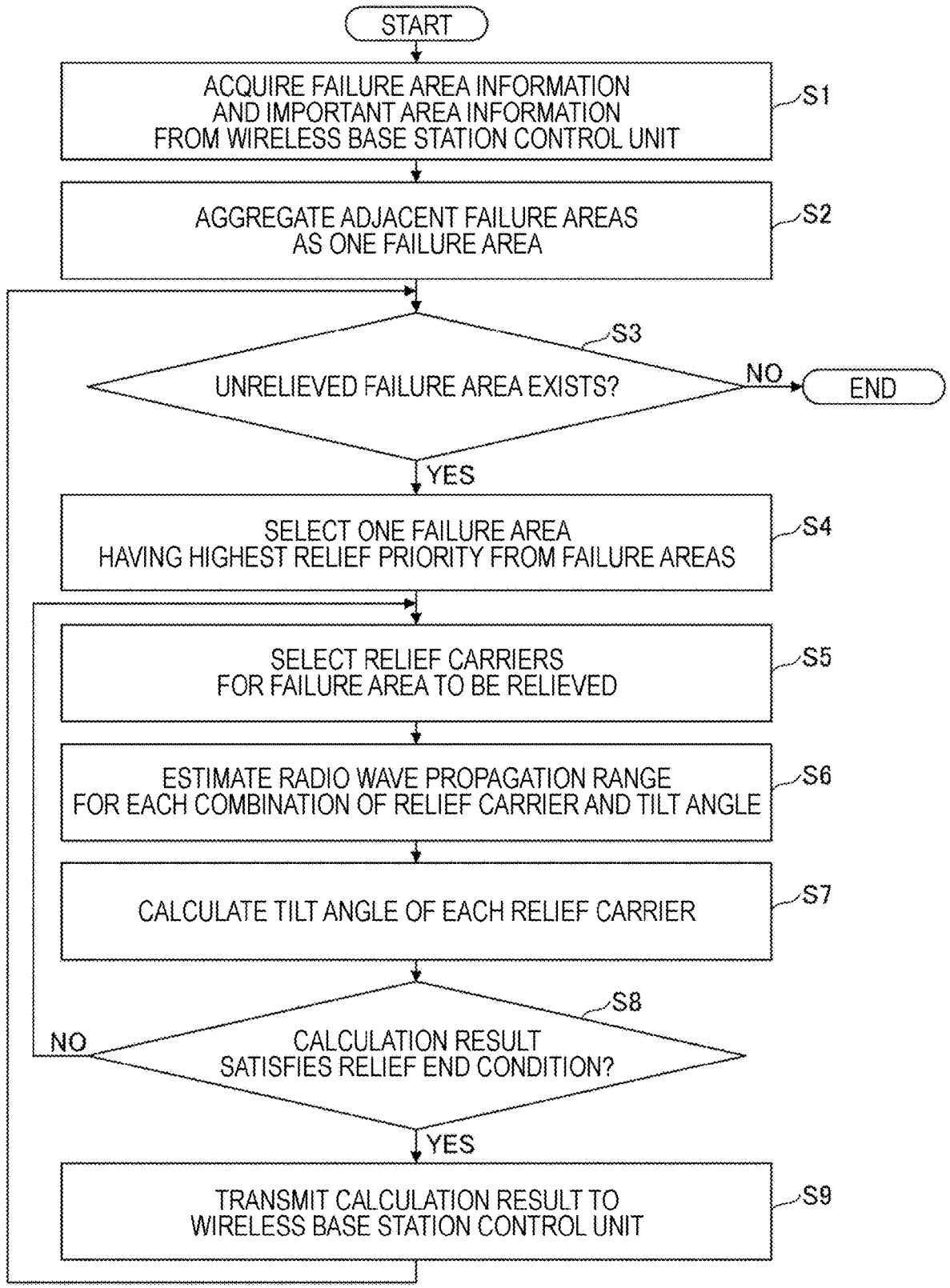
FIG. 3 is a flowchart showing an operation of the wireless base station control device.

Hereinafter, an operation example of the wireless base station control device 100 having the above configuration will be described in detail with reference to a procedure of the flowchart in FIG. 3.

<S1>

In S1, the input reception unit 110 receives input of the failure area information and the important area information as information necessary for relief from the wireless base station control unit 130. The information received by the input reception unit 110 is passed to the failure area aggregation unit 123 and the relief priority determination unit 121.

<S2>

In S2, the failure area aggregation unit 123 aggregates adjacent failure areas as one failure area. That is, the failure area aggregation unit 123 combines adjacent failure areas and redefines the adjacent failure areas as a single failure area. An upper limit may be set for the number of areas to be aggregated and a size of the area.

At this time, the failure area aggregation unit 123 also adds up the numbers of active users who have communicated and total traffic volumes that have been processed and aggregates information to the one failure area.

<S3 and S4>

In a case where there is a plurality of failure areas subjected to the processing in S2, the wireless base station control device 100 relieve the failure areas one by one from a failure area having the highest relief priority.

Therefore, in S3, the relief priority determination unit 121 confirms whether or not an unrelieved failure area exists and ends the processing when no unrelieved failure area exists. When an unrelieved failure area exists, the processing proceeds to S4. The relief priority determination unit 121 determines the relief priority of each unrelieved failure area and selects one failure area having the highest relief priority from the unrelieved failure areas.

The method in which the relief priority determination unit 121 determines the relief priority of each failure area is not limited to a specific method. For example, the relief priority determination unit 121 can determine the relief priority on the basis of an index according to urgency of communication establishment, such as "presence/absence of an important facility in the failure area", "a size of an important area in the failure area", "a size of the failure area", "the number of active users who have communicated with a failure antenna associated with the failure area", or "the total traffic volume that has been processed by the failure antenna associated with the failure area". A specific index may be appropriately determined by the operator of the system.

For example, in a case where the relief priority determination unit 121 determines the relief priority on the basis of the "number of active users who have communicated with the failure antenna", the relief priority is set higher as the number of active users is larger. Note that the relief priority determination unit 121 may determine the relief priority by using any one or a plurality of "presence/absence of an important facility in the failure area", "a size of an important area in the failure area", "a size of the failure area", "the number of active users who have communicated with a failure antenna associated with the failure area", or "the total traffic volume that has been processed by the failure antenna associated with the failure area".

<S5>

In S5, the relief carrier selection unit 122 selects relief carriers for the failure area to be relieved. Here, a plurality of carriers is selected from base stations around the failure area, and the selected carriers are defined as relief carriers. Details thereof are as follows.

The relief carrier selection unit 122 first calculates the center of gravity of the failure area. Then, m base stations are selected in order of proximity to the center of gravity, and one carrier having the lowest frequency band in each base station is selected from each base station. The selected carriers are defined as relief carriers.

For example, there are a base station 1, a base station 2, and a base station 3 in order of proximity to the center of gravity of the failure area. A relief carrier of the base station 1 is defined as a relief carrier 1, a relief carrier of the base station 2 is defined as a relief carrier 2, and a relief carrier of the base station 3 is defined as a relief carrier 3. In this case, first, S6 to S8 are performed for the relief carrier 1, and, when a determination result in S8 is No, then S6 to S8 are performed for the relief carriers 1 and 2. When the determination result in S8 is Yes, the failure area is relieved at tilt angles determined for the respective relief carriers 1 and 2. The above processing is merely an example. For example, S6 to S8 may be performed for a plurality of relief carriers from the beginning.

In the present embodiment, based on a property that radio waves experience less attenuation over distance at lower frequencies, a carrier in a low frequency band, which can be expected to cover a farther area, is preferentially selected as the relief carrier. Further, in a case where a traffic load situation for each carrier can be acquired, a carrier having the lowest load may be selected as the relief carrier.

The base stations from which the relief carriers are selected may be limited to adjacent stations of the failure antenna in the failure area. In this case, in a case where the number of adjacent stations l is l<m, the relief carriers are selected from all the adjacent stations.

<S6>

In S6, the tilt angle determination unit 124 estimates a radio propagation range for each combination of the relief carrier and the tilt angle. The estimation of the radio propagation range can be calculated independently for each combination and thus can be calculated in parallel. This makes it possible to speed up the calculation in S6.

The relief carrier has a settable range of the tilt angle. In the present embodiment, the tilt angle is changed with granularity of a predetermined angle unit, such as 0.5° or 1.0°, within the settable range. The tilt angle prepared for each predetermined angle unit within the settable range will be referred to as "each tilt angle". Then, the radio propagation range is estimated independently for all the combinations of the relief carrier and each tilt angle.

For example, in a case where the settable range of a tilt angle of a certain relief carrier is 1° to 15°, and the predetermined angle unit is 1°, the radio propagation range is estimated for fifteen tilt angles $\{1°, 2°, \ldots 14°, 15°\}$ of the relief carrier by the following method.

A strict radio propagation range is generally calculated in three dimensions of latitude, longitude, and altitude. However, in order to achieve quickness of relief, it is necessary to estimate the radio propagation range in a shorter time. Therefore, in the present embodiment, only a range covered with radio waves at 1.5 m above the ground will be considered as the radio propagation range. Herein, assuming a communication terminal held by a user, 1.5 m above the ground is set as an example. However, the height other than 1.5 m may be set.

Therefore, accuracy of the estimation result is reduced because the radio propagation range is not three-dimensionally estimated, but improvement in performance can be expected from the viewpoint of calculation speed.

The tilt angle determination unit 124 according to the present embodiment calculates the radio propagation range by using sector-shaped geometric approximation.

In order to strictly obtain the radio propagation range, it is common to estimate an electric field strength for each point and use a result of the estimation. However, as described above, it is necessary to estimate the radio propagation range in a shorter time in order to prioritize the quickness of relief. Therefore, in the present embodiment, it is assumed that radio waves reach the same distance in the entire range of the beam width in consideration of a property that "propagation loss of radio waves increases according to a distance", and, under this assumption, the radio propagation range is calculated by using the sector-shaped geometric approximation. A specific calculation method is as follows.

Here, a position of the relief carrier is denoted by (latitude lat, longitude lon), a height of the carrier is denoted by h, a center azimuth of the carrier is denoted by $az_{center}$, a tilt angle of the carrier is denoted by x, and vertical and horizontal beam widths (°) of a beam of the carrier are denoted by $\alpha$ and $\beta$, respectively. The height h of the carrier is 1.5 m above the ground.

A minimum value of the settable range of the tilt angle x is denoted by $x_{min}$ and a maximum value thereof is denoted by $x_{max}$.

At this time, a range of angles of the beam of the carrier in the vertical direction is denoted by $[v_{min}, v_{max}]$. Here, $v_{min}$ and $v_{max}$ are obtained by the following equations.

$$v_{min} = \max\{x - \alpha/2, x_{min}\}, v_{max} = \min\{x + \alpha/2, x_{max}\}$$

When radii of two sectors used for approximation of the radio propagation range are denoted by $d_{min}$ and $d_{max}$, the radii are obtained by the following equations.

$$d_{min} = h/\tan(v_{max}), d_{max} = h/\tan(v_{min})$$

Figure 4:
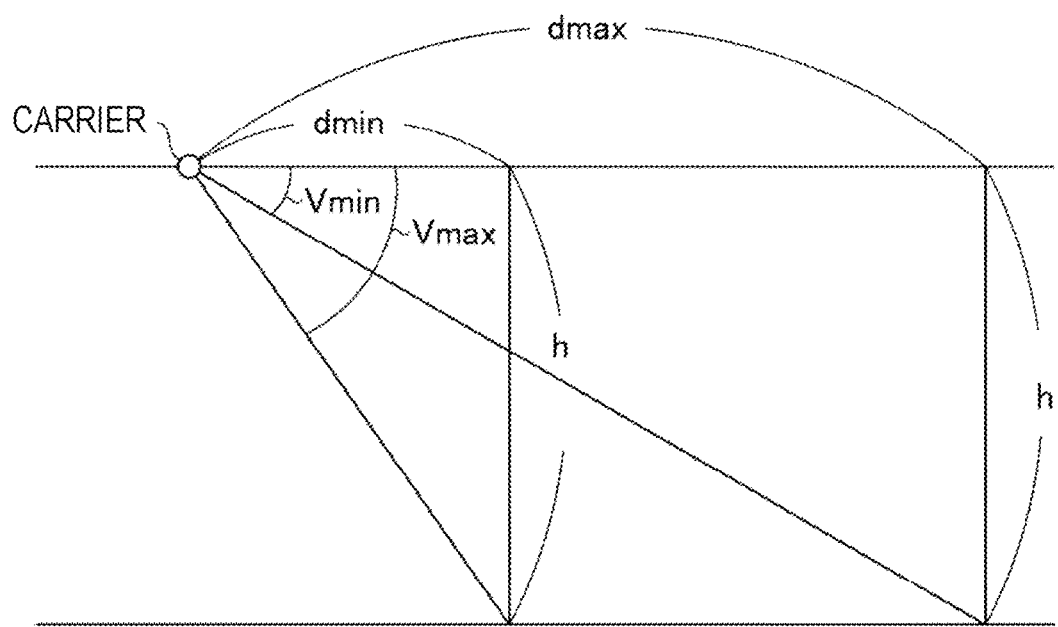
FIG. 4 illustrates $d_{max}$ and $d_{min}$.

FIG. 4 illustrates $d_{min}$ and $d_{max}$ obtained by the above equations.

When a start azimuth angle and an end azimuth angle of the above two sectors are denoted by $az_{start}$ and $az_{end}$, respectively, those angles are obtained by the following equations.

$$az_{start} = az_{center} + \beta/2, az_{end} = az_{center} - \beta/2$$

As described above, the start azimuth angle and the end azimuth angle of the two sectors are the same. Here, domains of $az_{start}$ and $az_{end}$ are set to $0 \leq az_{start}$ and $az_{end} < 360°$. With the above equations, in a case where the calculated values of $az_{start}$ and $az_{end}$ fall outside the domains, a remainder obtained modulo 360 is used.

A sector whose center is a point (lat, lon), radius is $d_{min}$, and center angle is $az_{start}$-$az_{end}$ and which is oriented from $az_{start}$ to $az_{end}$ is defined as a sector A. Similarly, a sector whose center is a point (lat, lon), radius is $d_{max}$, and center angle is $az_{start}$-$az_{end}$ and which is oriented from $az_{start}$ to $az_{end}$ is defined as a sector B.

Figure 5:
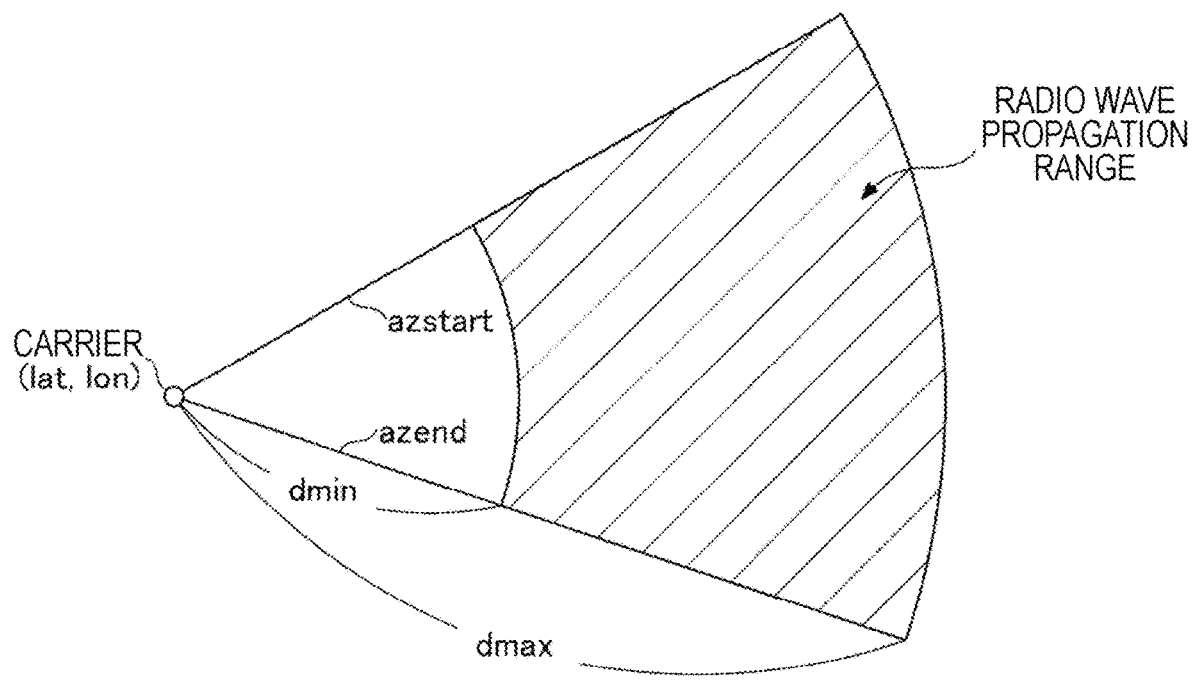
FIG. 5 illustrates two sectors.

The tilt angle determination unit 124 obtains the sector A and the sector B by the above calculation and obtains an area not included in the sector A in an area included in the sector B as the estimation result of the radio propagation range. The sectors A and B are illustrated in FIG. 5. FIG. 5 illustrates the two sectors seen from the above.

The tilt angle determination unit 124 performs the above calculation for each relief carrier and each tilt angle to estimate the radio propagation range.

<S7>

In S7, the tilt angle determination unit 124 calculates the tilt angle of the relief carrier. Specifically, for each relief carrier selected in S5, the tilt angle determination unit 124 calculates a combination of tilt angles that cover the failure area and reduce overlap of the coverage areas between the relief carriers.

Here, an objective function having the tilt angle of each relief carrier as an input is defined, and a combination of tilt angles at which the best objective function value is obtained is adopted as a calculation result. The objective function is defined by combining the "coverage rate of the failure area", the "coverage rate of an important area (in a case where the important area exists)", and the "coverage area size of the relief carrier". The failure area coverage rate, the important area coverage rate, and the coverage area size of the relief carrier are calculated by using the estimation result of the radio propagation range corresponding to each carrier and the tilt angle calculated in S6.

Here, as a constraint, an upper limit of the number of meshes in an area (described later) is set for the coverage area of each carrier, and the tilt angle is obtained within a range not exceeding the upper limit.

Hereinafter, methods of calculating the failure area coverage rate, the important area coverage rate, and the coverage area size of the relief carrier will be described, and then a method of calculating a combination of tilt angles will be described.

<Method of Calculating Failure Area Coverage Rate>

First, the method of calculating the failure area coverage rate will be described.

Here, the radio propagation range calculated in S6 is defined as a coverage area. An area originally covered by the relief carrier is defined as a foot area. The foot area may be acquired as base station information, or the tilt angle determination unit 124 may estimate the foot area by using the above radio propagation range estimation method. An area including the failure area and the foot area is defined as a failure area to be relieved.

The tilt angle determination unit 124 compares the coverage area with the failure area to be relieved, calculates a proportion of the coverage area in the failure area to be relieved, and sets the proportion as the failure area coverage rate. The coverage rate is calculated by using the number of meshes of the regional mesh.

When an area included in the coverage area and also included in the failure area to be relieved is defined as a relievable failure area, the tilt angle determination unit 124 calculates the failure area coverage rate by the following equation in a case where the regional mesh is used as described above.

(Failure area coverage rate)=(number of meshes in relievable failure area)/(number of meshes in failure area to be relieved)

<Method of Calculating Important Area Coverage Rate>

Next, a method of calculating the important area coverage rate will be described.

In a case where an important area exists in the failure area, an area including the important area and the foot area is defined as an important area to be relieved.

The tilt angle determination unit 124 compares the coverage area with the important area to be relieved, calculates a proportion of the coverage area in the important area to be relieved, and sets the proportion as the important area coverage rate.

That is, when an area included in the coverage area and also included in the important area to be relieved is defined as a relievable important area, the tilt angle determination unit 124 calculates the important area coverage rate by the following equation.

(Important area coverage rate)=(number of meshes in relievable important area)/(number of meshes in important area to be relieved)

<Method of Calculating Coverage Area Size of Relief Carrier>

Next, a method of calculating the coverage area size of the relief carrier will be described. As described below, the tilt angle determination unit 124 calculates the coverage area size of each carrier by using a ratio of the calculated number of meshes in the coverage area to the upper limit of the number of meshes in the coverage area.

(Coverage area size of carrier)=((number of meshes in coverage area))/((upper limit of number of meshes in coverage area))

The tilt angle determination unit 124 calculates the above value for each relief carrier and uses an average value thereof as the (coverage area size of the relief carrier) for a penalty term of the objective function. Therefore, it is possible to prevent each relief carrier from unnecessarily expanding the coverage area in order to improve the coverage rate and to suppress overlap of the coverage areas between the relief carriers.

<Method of Calculating Tilt Angle>

Next, the method of calculating the tilt angle will be described. First, an objective function is defined as follows.

(Objective function)=α(important area coverage rate)+β(failure area coverage rate)−γ(coverage area size of relief carrier)

The symbols α, β, and γ denote parameters for weighting the respective items and are set in advance. For example, when the priority at the time of relief is "maximization of the coverage rate of the important area", "maximization of the coverage rate of the failure area (excluding the important area)", or "minimization of overlap of the coverage areas", α>β>γ (e.g. α=10, β=5, γ=1) may be set.

Next, the tilt angle determination unit 124 maximizes the objective function by using a particle swarm optimization method (Non Patent Literature 2). The particle swarm optimization is a metaheuristic technique for obtaining an approximate solution of a combinatorial optimization problem. A plurality of possible solutions of an optimization problem called particles is prepared, and the particles are updated while sharing their objective function values. Using the particle swarm optimization method for maximizing the objective function is merely an example.

Here, "combinations of the tilt angles of all the relief carriers" corresponds to one particle. When the i-th particle is denoted by $x_i$, and the tilt angle of the j-th relief carrier in $x_i$ is denoted by $\theta_{ij}$ (1≤j≤m), $x_i=[\theta_{i1}, \theta_{i2}, \ldots, \theta_{im}]$ is obtained.

In the particle swarm optimization method, each particle $x_i$ is updated according to the following equations.

Update Equation of Particle:

$$x_i(t+1) = x_i(t) + v_i(t+1)$$

Update Equation of Particle Update Rate:

$$v_i(t+1) = wv_i(t+1) + c_1 r_1 (x_i^p(t) - x_i(t)) + c_2 r_2 (x^g(t) - x_i(t))$$

Here, meanings of the symbols (e.g. variables) are as follows.

$x_i(t)$: a particle at the number of updates t
$v_i(t)$: a velocity of the particle at the number of updates t
$x_i^p(t)$: the best solution of the particle i up to the number of updates t
$x^g(t)$: the best solution of the whole particles up to the number of updates t The symbols w and $c_1 c_2$ are coefficients, and r is a random number.

The update ends when the objective function value does not increase or when the number of updates set in advance is reached. A particle having the largest objective function value among the entire particles obtained by the update so far is adopted as a solution.

In addition to the above processing, in a case where coverage of the important area is prioritized, a particle having the largest important area coverage rate among the obtained particles may be adopted.

In the above example, the objective function whose object of the optimization is to maximize the objective function value is used, but this is merely an example. An objective function whose object of the optimization is to minimize the objective function value may be used.

<S8, S9>

In S8, the tilt angle determination unit 124 determines whether or not the calculation result satisfies a relief end condition, thereby determining whether to end the relief.

The relief end condition is, for example, "to satisfy the coverage rate of the important area in the failure area of P % or more and the failure area coverage rate of Q % or more by controlling relief stations and the tilt angles so far" or "to satisfy (number of relief carriers)=(number 1 of adjacent stations)".

Note that (number of relief carriers)=(number 1 of adjacent stations) corresponds to determination that the number of relief carriers cannot be increased any more.

When the end condition in S8 is satisfied, relief of the current failure area to be relieved ends, then the processing proceeds to S9, and information regarding "each relief carrier and the tilt angle" is transmitted to the wireless base station control unit 130. Then, the processing returns to S3.

When the condition is not satisfied in S8, the number of relief carriers is increased by one, then the processing returns to S5, and all the tilt angles of the relief carriers are recalculated.

(Hardware Configuration Example)

The wireless base station control device (or control device) according to the present embodiment can be implemented, for example, by causing a computer to execute a program in which processing contents described in the present embodiment are written. The "computer" may be a physical machine or a virtual machine on a cloud. In a case where a virtual machine is used, "hardware" described herein is virtual hardware.

The above program can be stored or distributed by being recorded in a computer-readable recording medium (e.g. portable memory). The above program can also be provided through a network such as the Internet or an electronic mail.

Figure 6:
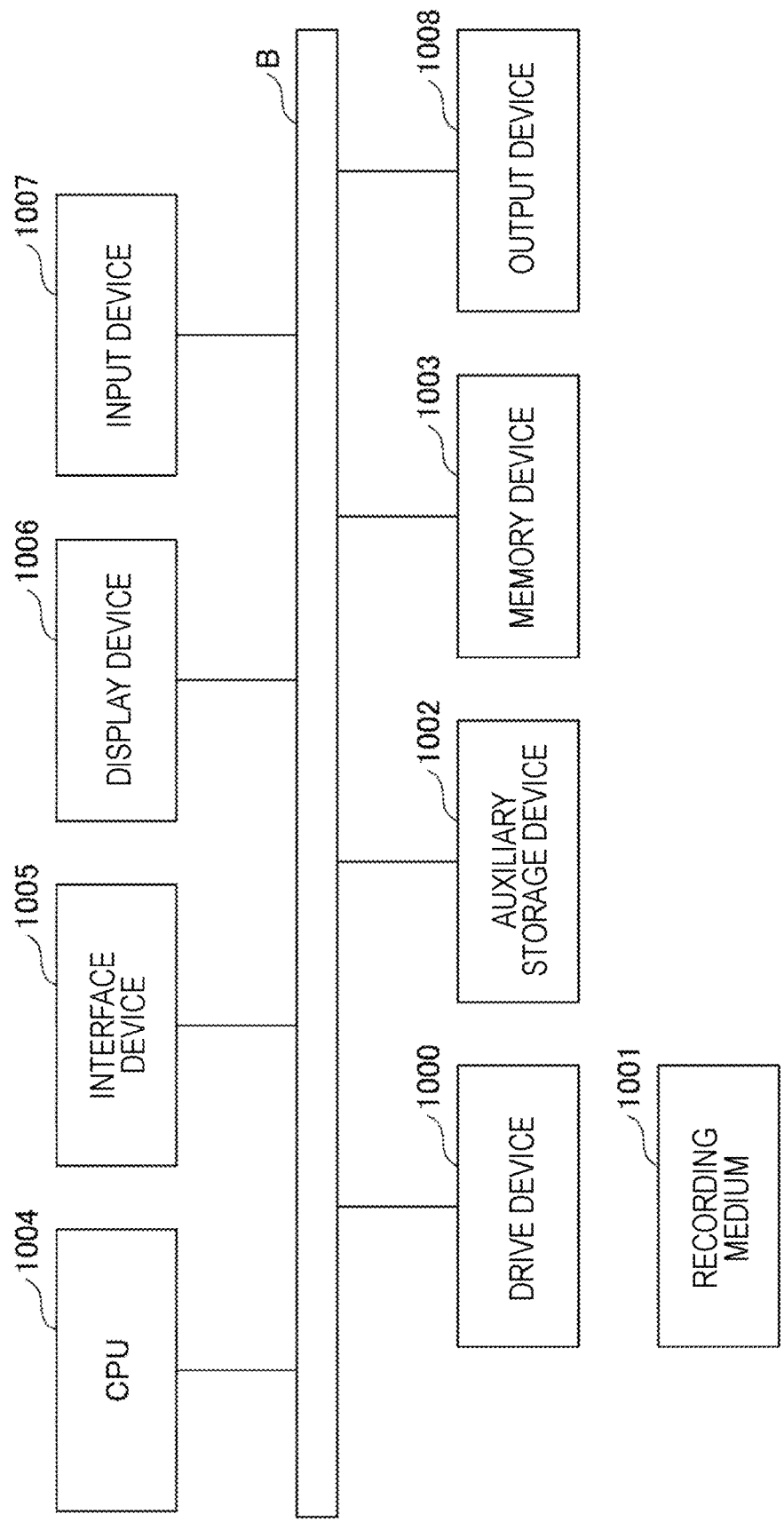
FIG. 6 illustrates a hardware configuration example of a device.

FIG. 6 illustrates a hardware configuration example of the computer. The computer in FIG. 6 includes a drive device 1000, an auxiliary storage device 1002, a memory device 1003, a CPU 1004, an interface device 1005, a display device 1006, an input device 1007, and an output device 1008, which are connected to one another by a bus BS.

A program for implementing processing in the computer is provided through a recording medium 1001 such as a CD-ROM or a memory card. When the recording medium 1001 storing the program is set in the drive device 1000, the program is installed in the auxiliary storage device 1002 from the recording medium 1001 via the drive device 1000. Here, the program is not necessarily installed from the recording medium 1001 and may be downloaded from another computer via a network. The auxiliary storage device 1002 stores the installed program and also stores necessary files, data, and the like.

When an instruction to start the program is given, the memory device 1003 reads the program from the auxiliary storage device 1002 and stores the program. The CPU 1004 implements a function related to the wireless base station control device 100 (control device) in accordance with the program stored in the memory device 1003. The interface device 1005 is used as an interface for connection to a network. The display device 1006 displays a graphical user interface (GUI) or the like according to the program. The input device 1007 includes a keyboard, mouse, button, touchscreen, and the like and is used to input various operation instructions. The output device 1008 outputs an operation result.

(Supplementary Notes)

At least a control device, a wireless communication system, and a program described in the following items are described in the present specification.

(Item 1)

A control device that determines a relief carrier that relieves communication in a failure area occurring when an antenna of a wireless base station fails and a tilt angle of the relief carrier, the control device including:

a failure area aggregation unit that aggregates a plurality of adjacent failure areas to collectively generate a single aggregated failure area;

a relief carrier selection unit that selects a plurality of relief carriers for the aggregated failure area; and a tilt angle determination unit that simultaneously optimizes a plurality of tilt angles in the plurality of relief carriers.

(Item 2)

The control device according to item 1, in which the relief carrier selection unit selects, as the relief carriers, a carrier having a lowest frequency in each base station selected in order of proximity to a center of gravity of the aggregated failure area.

(Item 3)

The control device according to item 1 or 2, in which the tilt angle determination unit performs the optimization by using an objective function including a coverage area size of the relief carriers as a penalty term.

(Item 4)

The control device according to item 3, in which the tilt angle determination unit performs the optimization by using the objective function including a failure area coverage rate of the aggregated failure area, an important area coverage rate of an important area in the aggregated failure area, and the coverage area size of the relief carriers.

(Item 5)

A wireless communication system including:

the control device according to any one of items 1 to 4; and a wireless base station that performs communication by using a relief carrier and a tilt angle determined by the control device.

(Item 6)

A program for causing a computer to function as each unit of the control device according to any one of items 1 to 4.

While the present embodiment has been described above, the present invention is not limited to such a specific embodiment, and various modifications and changes can be made within the scope of the spirit of the present invention described in the claims.

REFERENCE SIGNS LIST

10 Wireless base station
100 Wireless base station control device
110 Input reception unit
120 Data processing unit
121 Relief priority determination unit
122 Relief carrier selection unit
123 Failure area aggregation unit
124 Tilt angle determination unit
130 Wireless base station control unit
131 Reception unit
132 Transmission unit
1000 Drive device
1001 Recording medium
1002 Auxiliary storage device
1003 Memory device
1004 CPU
1005 Interface device
1006 Display device
1007 Input device
1008 Output device

The invention claimed is:

1. A control apparatus that determines a relief carrier that relieves communication in a failure area occurring when an antenna of a wireless base station fails and a tilt angle of the relief carrier, the control apparatus comprising:

a first processor; and a first memory that includes instructions, which when executed, cause the first processor to execute a first method, said first method including:

aggregating a plurality of adjacent failure areas to collectively generate a single aggregated failure area;

selecting a plurality of relief carriers for the aggregated failure area; and optimizing simultaneously a plurality of tilt angles in the plurality of relief carriers.

2. The control apparatus according to claim 1, wherein the selecting includes selecting, as the relief carriers, a carrier having a lowest frequency in each base station selected in order of proximity to a center of gravity of the aggregated failure area.

3. The control apparatus according to claim 1, wherein the optimizing includes optimizing by using an objective function including a coverage area size of the relief carriers as a penalty term.

4. The control apparatus according to claim 3, wherein the optimizing includes optimizing by using the objective function including a failure area coverage rate of the aggregated failure area, an important area coverage rate of an important area in the aggregated failure area, and the coverage area size of the relief carriers.

5. A wireless communication system comprising:

the control apparatus according to claim 1; and a wireless base station including:

a second processor; and a second memory that includes instructions, which when executed, cause the second processor to execute a second method, said second method including:

performing communication by using a relief carrier and a tilt angle determined by the control apparatus.

6. A non-transitory computer-readable recording medium having computer-readable instructions stored thereon, which when executed, cause a computer including a memory and a processor to execute a process, the process comprising:

aggregating a plurality of adjacent failure areas to collectively generate a single aggregated failure area;

selecting a plurality of relief carriers for the aggregated failure area; and optimizing simultaneously a plurality of tilt angles in the plurality of relief carriers.

* * * * *